US011869461B2

(12) United States Patent
Cohen et al.

(10) Patent No.: US 11,869,461 B2
(45) Date of Patent: Jan. 9, 2024

(54) GUITAR TUNER

(71) Applicants: David Cohen, Somerville, MA (US); Mariann Uleberg-Cohen, Somerville, MA (US)

(72) Inventors: David Cohen, Somerville, MA (US); Mariann Uleberg-Cohen, Somerville, MA (US)

(73) Assignee: Equilibrium Guitars LLC, Charlestown, MA (US)

( * ) Notice: Subject to any disclaimer, the term of this patent is extended or adjusted under 35 U.S.C. 154(b) by 0 days.

(21) Appl. No.: 17/820,511

(22) Filed: Aug. 17, 2022

(65) Prior Publication Data

US 2023/0057797 A1 Feb. 23, 2023

Related U.S. Application Data

(60) Provisional application No. 63/234,815, filed on Aug. 19, 2021.

(51) Int. Cl.
*G10D 3/153* (2020.01)

(52) U.S. Cl.
CPC .................................... *G10D 3/153* (2020.02)

(58) Field of Classification Search
CPC ............. G10D 3/153; G10D 3/14; G10D 1/08
See application file for complete search history.

(56) References Cited

U.S. PATENT DOCUMENTS

| | | | |
|---|---|---|---|
| 4,686,833 A | 8/1987 | Piche et al. | |
| 5,986,191 A | 11/1999 | McCabe | |
| 6,784,353 B1 | 8/2004 | Davis | |
| 7,470,841 B1 | 12/2008 | McCabe | |
| 8,952,231 B1 | 2/2015 | Gonzalez | |
| 2015/0068385 A1* | 3/2015 | Oliver | G10D 3/14 29/896.22 |

FOREIGN PATENT DOCUMENTS

| | | |
|---|---|---|
| CN | 105118480 A | 12/2015 |
| WO | 2016/097816 A2 | 6/2016 |

OTHER PUBLICATIONS

ABM 3801c Guitar Tuner Bridge. Retrieved online at: https://abm-guitarpartsshop.com. 7 pages, retrieved Apr. 27, 2021.

(Continued)

*Primary Examiner* — Kimberly R Lockett
(74) *Attorney, Agent, or Firm* — McCarter & English, LLP

(57) ABSTRACT

A tuner for a guitar having a neck and string nut including a plurality of nut slots configured to receive respective guitar strings. A tuner mount is fixedly secured to the neck and a tuner body is mounted on the tuner mount. A string break angle fastener is engageable with a guitar string passing through the respective nut slot and sets a break angle of the guitar string. A string lock carriage is movably mounted on the tuner body and includes a string fastener engageable with the guitar string passing through the respective nut slot to secure the guitar string to the carriage. A tuner knob is manually movable to drive the string carriage and thereby adjust the tension of and tune the respective guitar string.

37 Claims, 7 Drawing Sheets

(56) References Cited

OTHER PUBLICATIONS

Mera Guitars, Double Locking Headless System "Submarine III". Retrieved online at: http://meraguitars.com/eng/parts/mech/submarine3.html. 1 page, (2016).

Strandbergguitars, Tuner Assembly Black. Retrieved online at: https://strandbergguitars.com/eu/product/tuner-assembly-black/. 5 pages. Retrieved online Apr. 27, 2021.

Technology4musicians, Products . Bridges . SBridge. Retrieved online at: https://www.technologyformusicians.com/hsbridge.php?lingua=2. 1 page, retrieved Apr. 27, 2021.

* cited by examiner

GUITAR TUNER

CROSS-REFERENCE TO PRIORITY APPLICATION

This patent application claims priority under 35 U.S.C. § 119 to U.S. provisional patent application No. 63/234,815, filed Aug. 19, 2021, entitled "Guitar Tuner," which is hereby expressly incorporated by reference in its entirety as part of the present disclosure.

FIELD OF THE INVENTION

The present invention relates to tuners for guitars and bass guitars, and more particularly, to tensionable inline tuners.

BACKGROUND INFORMATION

Electric guitars and basses have been a mainstay of popular music for over 50 years. But unlike most traditional musical instruments which have certain requirements in their construction to be considered a representative example of such instruments, electric guitars and basses have been liberated from certain design constraints. As a result, their size, range, construction, electronic components and functional hardware have been evolving. As part of this evolution, guitars and basses have been built to be lighter in weight, more compact and portable through the shortening of traditional headstocks. In addition, specialized hardware to accommodate these adaptations have been gaining in popularity as well. These types of guitars and guitar basses have been referred to as "headless guitars." The specialized hardware for such headless guitars commonly consists of a "headpiece" or set of "string locks" located behind a string-nut, which anchor the strings in place. Headless guitars traditionally utilize a body-mounted mechanism to tune the strings to pitch, such as a separate tailpiece or a tuning mechanism integrated into the bridge hardware itself. However, there are shortcomings in current hardware options for "headless" guitars and basses.

One problem encountered in current hardware systems for headless guitars is that the nature of the instrument imposes design limitations. Headless guitar bridges and tailpieces require an access point for the user to be able to turn the knurled tuning knobs, either by way of a recess behind the bridge/tailpiece, or a body shape that leaves the knobs fully exposed. Requiring that the profile, contouring and overall construction of an instrument be tailored to a specific piece of hardware complicates and limits the design possibilities for a guitar-maker.

Another drawback is compromised bridge design. The attempt to fully integrate a tuning mechanism into a guitar bridge has created its own set of problems due to the inherent compromises in doing so. If the bridge hardware is comfortable and discrete, the adjustability for string height, intonation and tuning range becomes limited by the requisite small size. If the bridge has full-range saddles (the components that the strings rest on at the bridge which set the string height, spacing and intonation) and a sufficient tuning range, the hardware invariably becomes large and cumbersome, which works against the purpose of having a headless guitar in the first place.

Yet another drawback is that the headless guitar tuners can be uncomfortable to tune. The knurled tuning knobs on bridge mounted headless tuners are spaced extremely close together, and in many cases are close to the top of the guitar as well. As a result, there can be very little room to be able to manipulate the knobs. Furthermore, having the tuners on the same side of the string as the player's picking hand requires awkward body positions to be able to pluck a string and tune it simultaneously.

A further drawback are string lock compromises. Headstock-mounted string locks have no way to set or adjust the break angle of the string between the lock and the string nut, but instead are set by the height of the surface to which they are attached. If the string locks are too high, the strings can buzz. If, on the other hand, the string locks are too low, restringing becomes challenging because of the limited space between the string-through hole and the nut or fretboard end. Individual string locks also can be relatively complicated to install and can require multiple small, easily stripped-out and perfectly aligned mounting holes to work properly.

Bridge designs exist that have separated the action-setting and tuning mechanisms into a bridge and tailpiece respectively, but the tailpiece still requires significant space on the surface of the guitar and limits the instrument design. Smaller bridges are more comfortable, but have narrow adjustment range. Larger bridges have sufficient adjustment range, but are heavy and unsightly. Some headpieces feature string-thru holes for the ball end of a string instead of a string-lock for the tapered end, but this requires a bridge tuner with a string-lock, and the aforementioned inconveniences and guitar design limitations still apply. Headstock-mounted tuners are common, but they typically require too much surface area to install securely and operate effectively for the instrument to be considered as, or to offer the benefits of a "headless" guitar or bass.

It is an object of the present invention, and/or of the embodiments thereof, to overcome one or more of the above-described drawbacks and/or disadvantages of the prior art.

SUMMARY OF THE INVENTION

In accordance with a first aspect, the present invention is directed to a tuner for a guitar comprising a neck having a proximal end and a distal end, and a string nut mounted on the neck proximal to the distal end thereof and including a plurality of nut slots laterally spaced relative to each other. Each nut slot is configured to receive a respective guitar string, and the neck defines a neck face extending between the string nut and the distal end of the neck. The tuner comprises a tuner mount configured to be seated on and fixedly secured to the face of the neck between the string nut and the distal end of the neck. A tuner body is configured for mounting on the tuner mount and includes a proximal end and a distal end. A string break angle fastener is mounted on the tuner body at or adjacent to the proximal end thereof, and is spaced adjacent to a respective nut slot. The break angle fastener is engageable with a guitar string passing through the respective nut slot and sets a break angle of the guitar string between the string nut and the break angle fastener. A string carriage is movably mounted on the tuner body on an opposite side of the string break angle fastener relative to the string nut. The string carriage includes a string fastener engageable with the guitar string passing through the respective nut slot and engaged by the string break angle fastener to secure the guitar string to the string carriage. A tuner knob is mounted on the tuner body on an opposite side of the string carriage relative to the string break angle fastener and is drivingly connected to the string carriage. The tuner knob is manually movable to drive the string carriage either toward or away from the string break angle fastener to adjust the tension of and tune the respective guitar string.

In some embodiments of the present invention, the tuner knob is movable between retracted and extended positions. A distal end of the tuner knob is closer to the distal end of the tuner body in the retracted position and is farther from the distal end of the tuner body in the extended position. The tuner knob is manually movable in the extended position to tune the respective guitar string. In some such embodiments, in the retracted position, the distal end of the guitar neck is inset adjacent to the distal end of the tuner knob to prevent accidental adjustment of or damage to the knob in the retracted position. In some such embodiments, in the retracted position, the distal end of the tuner knob is spaced less than about % inch from the distal end of the neck.

Some embodiments of the present invention further comprise a drive member mounted on the tuner body between the string carriage and tuner knob and including a proximal end and a distal end. The proximal end of the drive member is drivingly connected to the string carriage, and the distal end is connected to the tuner knob. Rotation of the tuner knob moves the drive member to move the string carriage either toward or away from the string break angle fastener. In some such embodiments, the drive member is threadedly engaged with the string carriage, and rotation of the drive member by the tuner knob moves the string carriage toward or away from the string break angle fastener.

Some embodiments of the present invention further comprise a tuner knob support mounted on the tuner body and connected to the drive member. The tuner knob is slidably mounted on the tuner knob support to move between the retracted and extended positions. Some such embodiments further comprise a dampening or friction member mounted on the tuner knob support or tuner knob and engageable with the other to releasably retain the tuner knob in the retracted and/or extended positions. In some such embodiments, the dampening or friction member is made of an elastomeric or resilient material, is mounted on the tuner knob support, and frictionally engages the tuner knob. Some embodiments further comprise a magnet configured to releasably retain the tuner knob in the retracted position.

Some embodiments of the present invention further comprise a mounting fastener releasably securing the tuner body to the tuner mount. Upon removal of the mounting fastener, the tuner body is manually movable away from the tuner mount with the guitar string engaged by the string break angle fastener and/or the string fastener. In some such embodiments, the tuner body or tuner mount includes a male connector, and the other of the tuner body or tuner mount includes a female connector. The male connector is receivable within the female connector to releasably secure the tuner body to the tuner mount. In some such embodiments, (i) the male connector defines a pin or protuberance and the female connector defines a corresponding receptacle for receiving the pin or protuberance, and/or (ii) the male connector and female connector define a dovetail connection.

In some embodiments of the present invention, the tuner body includes a fastener aperture adjacent to the proximal end, and the male connector connected thereto at or adjacent to the distal end. Upon removal of the mounting fastener from the mounting plate, the tuner body is manually movable away from the tuner mount with the guitar string engaged by the string break angle fastener and/or the string fastener by moving the male connector away from the female connector.

Some embodiments of the present invention comprise a plurality of tuner bodies. Each tuner body is aligned with and spaced adjacent to a respective nut slot and is configured to receive and engage the respective guitar string passing therethrough. In some such embodiments, each tuner body defines an elongated axis, each guitar string defines an elongated axis, and the elongated axis of each tuner body is substantially aligned with and substantially parallel to the elongated axis of the respective guitar string. In some such embodiments, the neck face defines two lateral edges on opposite sides of the face relative to each other, each lateral edge extends along the respective edge of the neck between the string nut and the distal end of the neck, and the plurality of tuner bodies are mounted in a side-by-side relationship between the two lateral edges of the neck face. In some embodiments, the tuner bodies are located within and do not extend over either lateral edge of the neck face. Preferably, the string break angle fastener of each of the plurality of tuner bodies sets substantially the same break angle of the guitar string between the string nut and the break angle fastener. In some such embodiments, the substantially same break angle of the plurality of tuner bodies is at least about 5°. In some such embodiments, the substantially same break angle of the plurality of tuner bodies is within the range of about 5° to about 150.

In some embodiments of the present invention, the guitar includes a fretboard defining a centerline, the neck defines a distal neck-material protrusion extending between the string nut and the distal and of the neck, and the distal neck-material protrusion defines the face. The neck face is oriented at an angle relative to the centerline of the fretboard within the range of about 0° to about 20°. When the plurality of tuner bodes are mounted on the face, the string break angle fastener of each of the plurality of tuner bodies sets substantially the same break angle of the guitar string between the string nut and the break angle fastener. In some such embodiments, the face is oriented at an angle of about 0° and is approximately parallel to the centerline of the fretboard to thereby define a straight “headstock” or distal end portion of the neck. In other embodiments, the angle is greater than 0° to thereby define an angled “headstock” or distal end portion of the neck.

Some embodiments of the present invention further comprise (i) a single tuner mount having mounted thereon a plurality of tuner bodies in side-by-side relationship to each other, or (ii) a plurality of tuner mounts, wherein each of the tuner mounts includes a single tuner body or a plurality of tuner bodies mounted thereon, and all tuner bodies are mounted in side-by-side relationship to each other. In some such embodiments, the tuner mount is a tuner mounting plate. Some embodiments further comprise a plurality of tuner mounting plates configured to be mounted in a side-by-side relationship to each other on the neck face extending between the string nut and the distal end of the neck. In some embodiments, the tuner mounting plate is a gang mounting plate configured (i) to be mounted on the neck face extending between the string nut and the distal end of the neck and (ii) for the plurality of tuner bodies to be mounted thereon in a side-by-side relationship to each other.

In some embodiments of the present invention, the string carriage defines an aperture in a proximal end thereof configured to receive therein a distal end of the respective guitar string. The string fastener is received within the aperture and is configured to clamp the guitar string and enclose the end of the guitar string within the aperture and/or interior of the carriage.

In accordance with another aspect, the present invention is directed to a tuner for a guitar comprising a neck having a proximal end and a distal end, and a string nut mounted on the neck proximal to the distal end thereof and including a plurality of nut slots laterally spaced relative to each other. Each nut slot is configured to receive a respective guitar string, and the neck defines a neck face extending between the string nut and the distal end of the neck. The tuner comprises first means for seating the tuner thereon and fixedly securing the tuner to the neck face. A body of the tuner includes a proximal end and a distal end. Second means are mounted on the body adjacent to the proximal end thereof and spaced adjacent to a respective nut slot for engaging a guitar string passing through the respective nut slot and setting a break angle of the guitar string between the string nut and the second means. Third means are provided for moving on the body on an opposite side of the second means relative to the string nut. The third means include fourth means for engaging the guitar string passing through the respective nut slot and engaged by the second means for securing the guitar string to the third means. Fifth means are mounted on the body on an opposite side of the third means relative to the second means for manually moving the third means either toward or away from the second means for adjusting the tension of and tuning the respective guitar string.

In some embodiments of the present invention, the first means is one or more tuner mounting plates, the second means is a string break angle fastener, the third means is a string carriage, the fourth means is a string fastener, and the fifth means is a tuner knob.

Some embodiments of the present invention further comprise sixth means for supporting and allowing movement of the fifth means between retracted and extended positions. A distal end of the fifth means is closer to the distal end of the tuner body in the retracted position and is farther from the distal end of the tuner body in the extended position. The fifth means is manually movable in the extended position to tune the respective guitar string. Some embodiments of the present invention further comprise seventh means for releasably retaining the fifth means in the retracted position.

One advantage of the present invention, and/or of embodiments thereof, is that the tuner is mounted to the top surface of an area behind the string nut, is compact enough to preserve benefits of a headless guitar, while allowing the guitar-maker to use traditional (non-headless) hardware on the guitar. Yet another advantage is that the string break angle fastener, which can take the form of a small, removable set-screw located at the proximal or front end of the tuner, allows for independent adjustment of the break angle of the string, easy restringing and optimal string tension. Each tuning knob is able to slide along its respective support past the distal edge of the neck face or "headstock" to allow the user to comfortably adjust the pitch of each string without the other tuners in the way. In one embodiment, the tuning knobs are knurled and each knob support is a hex-shaped shaft.

Yet another advantage is that virtually any bridge hardware can be used, unlike other headless guitars that are reliant on specific and limited headless hardware. Unlike headless string-locks or headpieces, each tuner can attach to either an individual or ganged mounting plate, allowing for quicker, simpler installation with perfect alignment. The break angle fastener or set-screw eliminates the stringing difficulty and potential buzzing issues common with the above-described prior art systems. Sliding knobs are much more comfortable to use than other systems because they can be manipulated without the others in the way. Yet another advantage is that the tuners can be installed on virtually any neck to be able to make a "headless" version of that guitar. This will be of great value to both guitar-makers and modifiers alike.

Other advantages of the present invention, and/or of the embodiments thereof, will become more readily apparent in view of the following detailed description and accompanying drawings.

DETAILED DESCRIPTION

Figure 1:
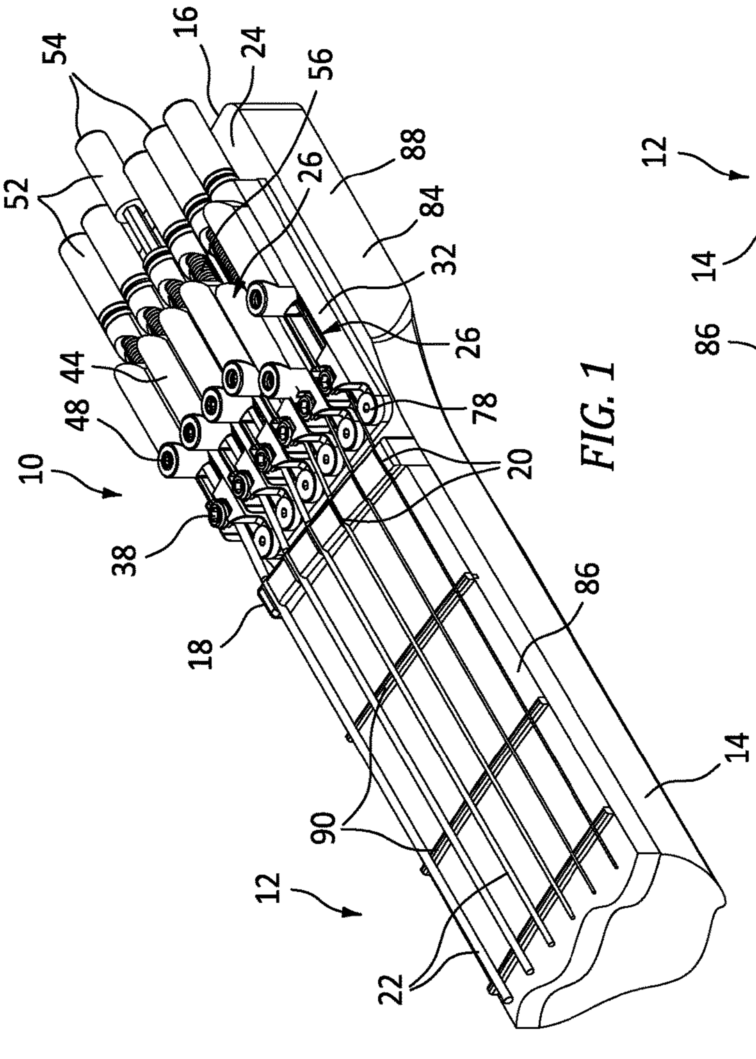
FIG. 1 is a perspective view of a tuner assembly embodying the present invention mounted on the distal end of the neck of a "headless" guitar.
Figure 4:
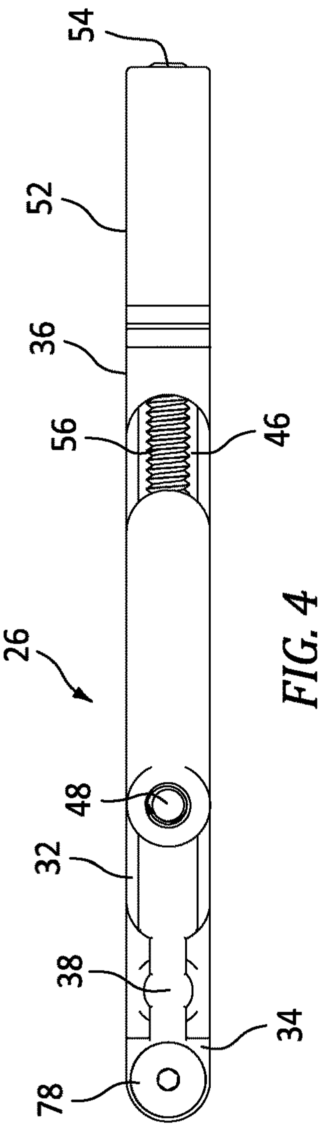
FIG. 4 is a top plan view of one of the tuners or tuner mechanisms of the tuner assembly of FIG. 1 shown not mounted on the guitar.
Figure 5:
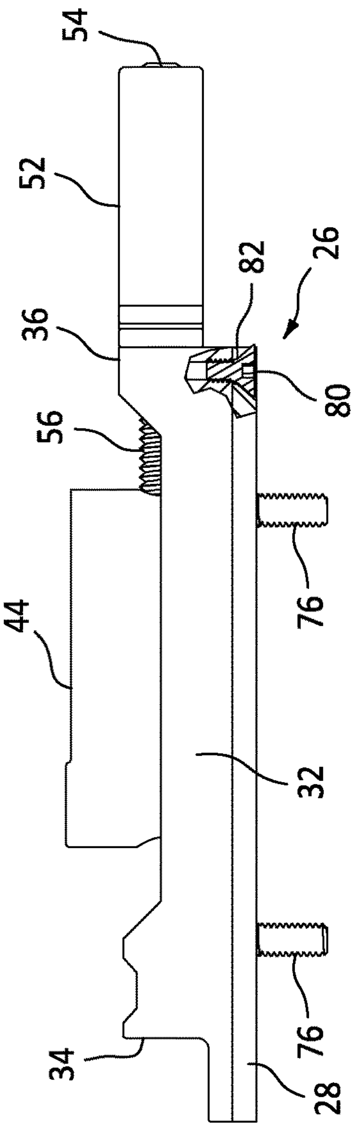
FIG. 5 is a side elevational view of the tuner of FIG. 4.
Figure 3:
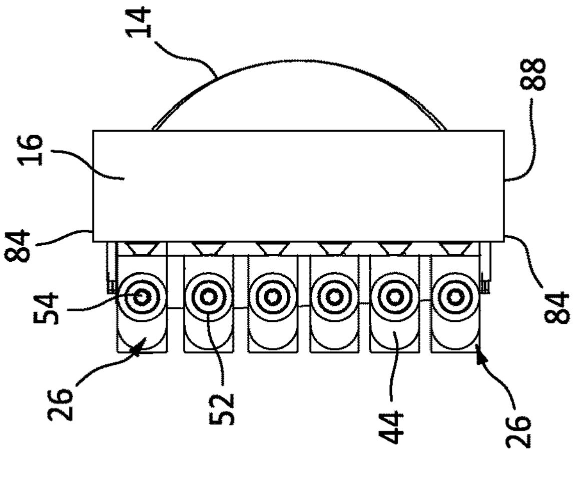
FIG. 3 is an end view of the tuner assembly and guitar neck of FIG. 1.
Figure 6:
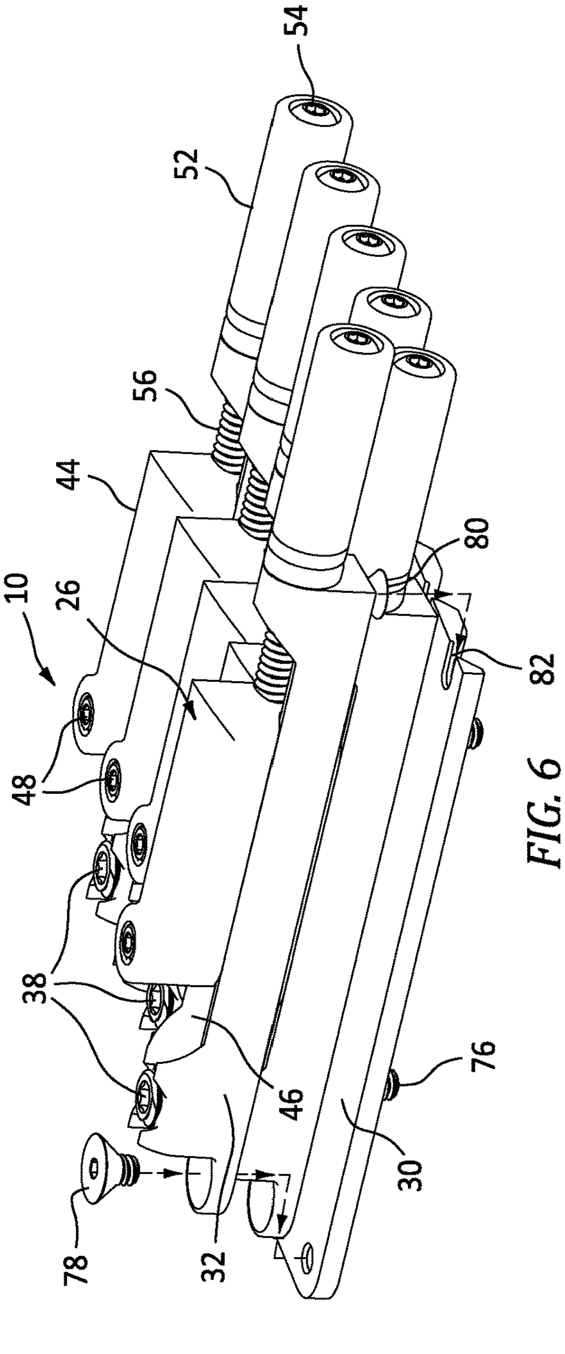
FIG. 6 is a perspective, partially-exploded view of the tuner assembly of FIG. 1 including a plurality of tuners mounted in a side-by-side relationship on a ganged mounting plate which is, in turn, mounted on the neck face at the distal end portion of the guitar neck.
Figure 7:
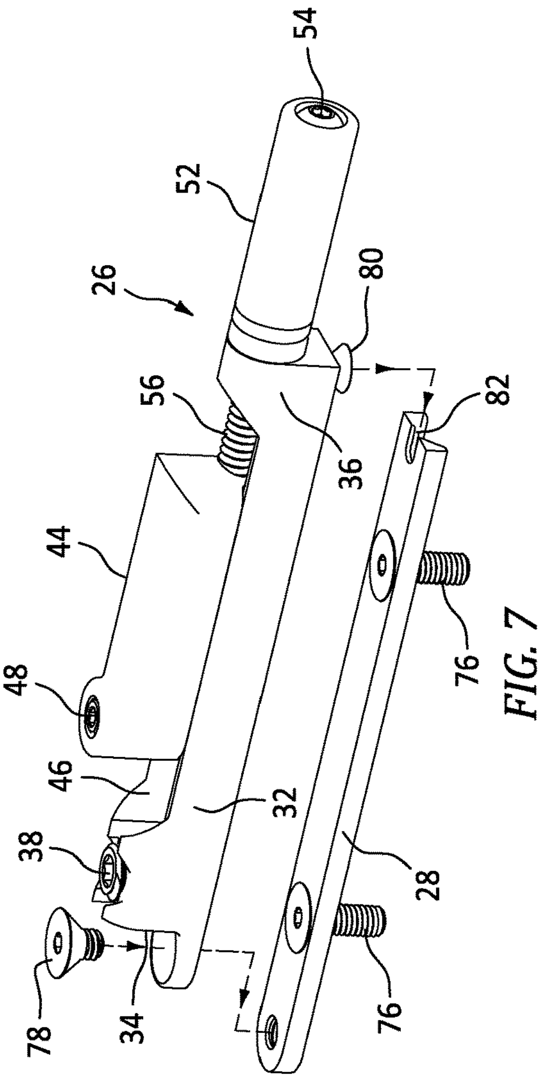
FIG. 7 is a perspective, partially-exploded view of one of the tuners of the tuner assembly of FIG. 1 mounted on a single mounting plate and enabling a configuration where a plurality of tuners and respective mounting plates are mounted in side-by-side relationship on the neck face at the distal end portion of the guitar neck.
Figure 8:
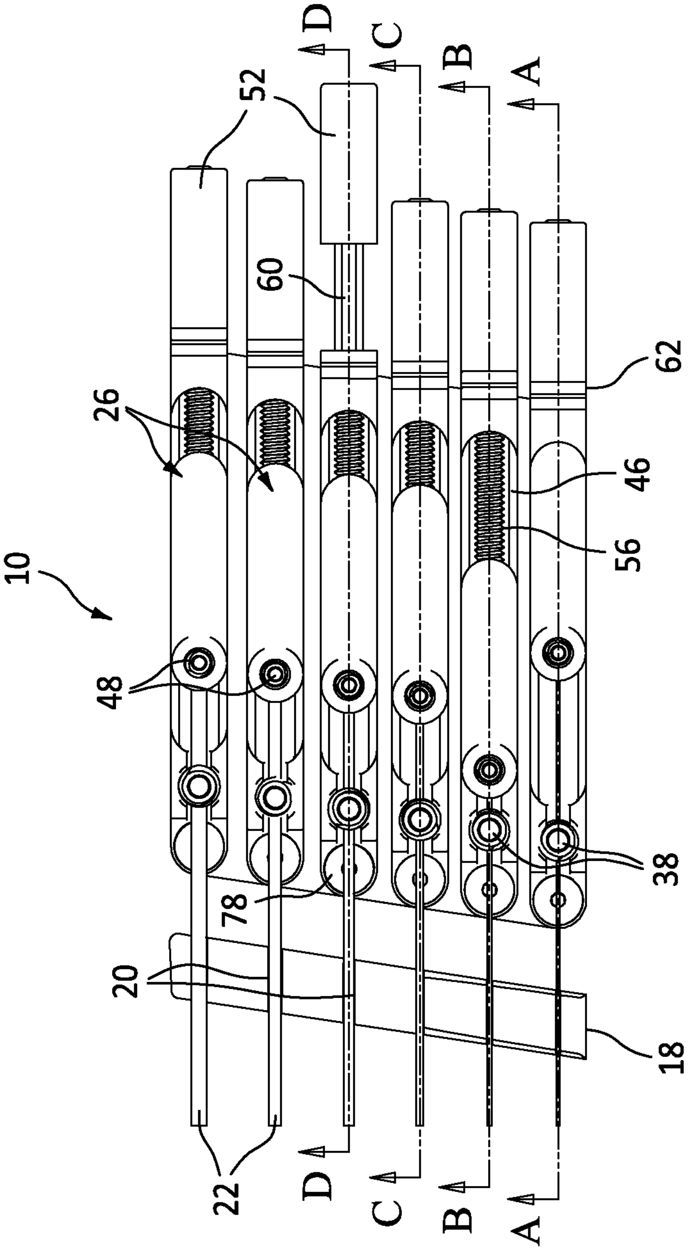
FIG. 8 is a partial, top plan view of the tuner assembly of FIG. 1 showing the tuner assembly, guitar strings and string nuts, but not the underlying guitar neck.

In FIG. 1, a tuner assembly embodying the present invention is indicated generally by the reference numeral 10. The tuner assembly 10 is mounted on a guitar 12 comprising a neck 14 having a proximal end (not shown) and a distal end 16. A string nut 18 is mounted on the neck proximal to the distal end 16 thereof and includes a plurality of nut slots 20, 20 laterally spaced relative to each other. Each nut slot 20, 20 is configured to receive a respective guitar string 22, 22, and the neck 14 defines a neck face 24 extending between the string nut 18 and the distal end 16 of the neck. The tuner assembly 10 comprises a plurality of tuners 26, 26 where each tuner is connected to a respective guitar string 22 to tune the string, and the plurality of tuners are mounted in a side-by-side relationship on the neck face 24. As shown in FIGS. 4, 6 and 7, each tuner 26 can be mounted on a respective tuner mounting plate 28 configured to be seated on and fixedly secured to the neck face 24. As can be seen, the tuner mounting plates 28 and respective tuners 26 mounted thereon are configured to be mounted in a side-by-side relationship to the neck face. Alternatively, as shown in FIG. 6, a plurality of tuners 26, 26 can be mounted in a side-by-side relationship on a ganged mounting plate 30 which is, in turn, mounted on the neck face 24. In the illustrated embodiment of FIG. 6, all of the tuners 26 of the tuner assembly 10 are mounted on a single ganged mounting plate 30. However, as may be recognized by those of ordinary skill in the pertinent art based on the teachings herein, plural ganged mounting plates may be employed, or a combination of ganged mounting plates and individual mounting plates may be employed.

Figure 9A:
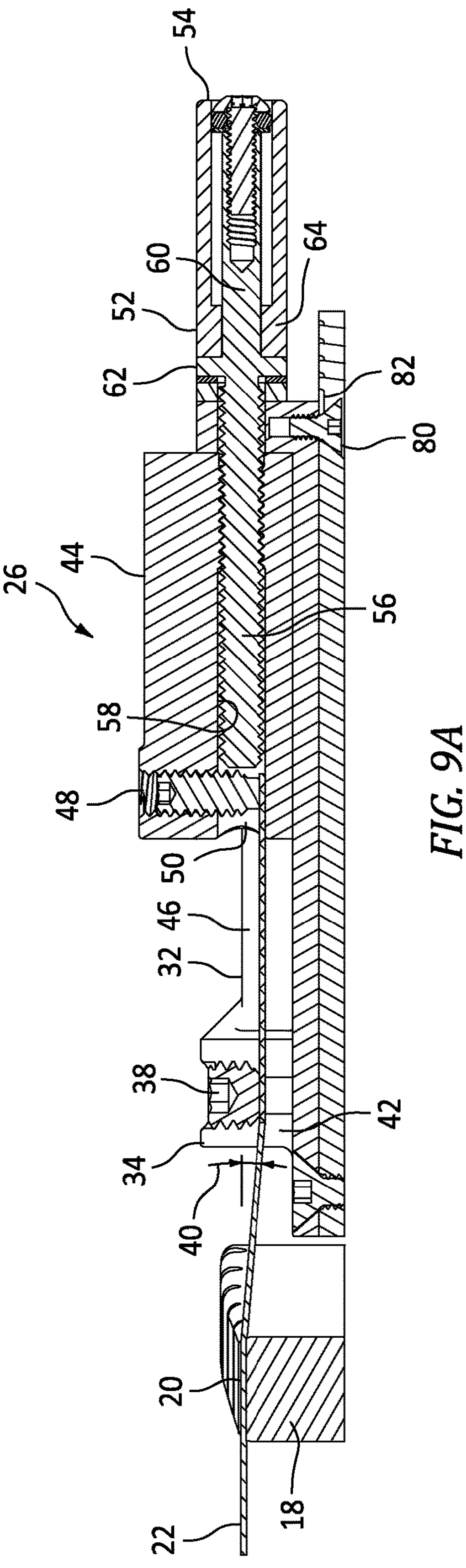
FIG. 9A is a cross-sectional view of one of the tuners of the tuner assembly of FIG. 8 taken along line A-A of FIG. 8, showing a guitar string passing through the respective nut slot where the string is engaged by the string break angle fastener to set the break angle of the string, the end of the string is received within and connected to the string lock carriage, the string lock carriage is in the fully rearward or distal position, and the tuning knob is in the retracted position.
Figure 9B:
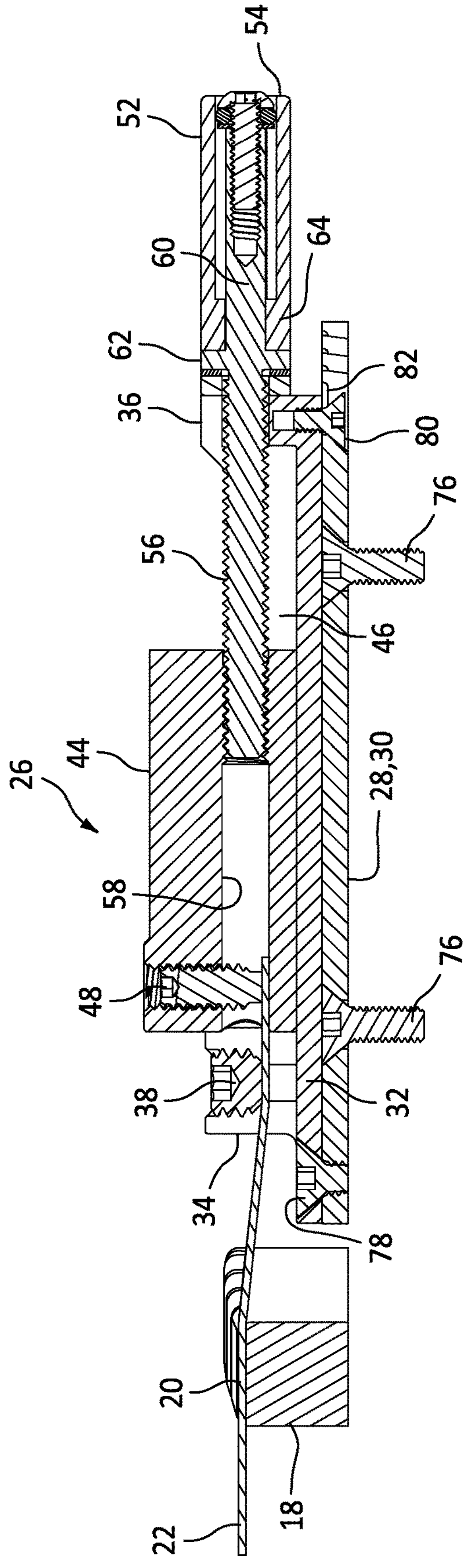
FIG. 9B is a cross-sectional view of another tuner of the tuner assembly of FIG. 8 taken along line B-B of FIG. 8, showing a guitar string passing through the respective nut slot where the string is engaged by the string break angle fastener to set the break angle of the string, the end of the string is received within and connected to the string lock carriage, the string lock carriage is in the fully forward or proximal position, and the tuning knob is in the retracted position.

Each tuner 26 includes a tuner body 32 configured for mounting on the tuner mount 28 or 30, and each tuner body includes a proximal end 34 and a distal end 36. A string break angle fastener 38 is mounted on the tuner body at or adjacent to the proximal end 34, and is spaced adjacent to a respective nut slot 20 of the guitar string nut 18. Each break angle fastener 38 is engageable with a guitar string 22 passing through the respective nut slot 20 and sets a break angle 40 (FIGS. 9A and 9C) of the guitar string between the string nut and the break angle fastener. Each tuner body 32 defines a string aperture 42 extending through the proximal end 34 thereof for receiving the end of the respective guitar string 22 into the tuner body 32. In the illustrated embodiment, the string break angle fastener 38 is a set screw threadedly engaged within the tuner body 32 and in communication with the string aperture 42 to engage the upper side of the guitar string 22 passing through the string aperture. As can be seen, adjustment of the string break angle fastener 38 adjusts and sets the string break angle 40. The string break angle fastener 38 is preferably flush with, or recessed within the respective upper surface of the tuner body 32.

Each tuner 26 includes a string carriage 44 slidably mounted within an axially-elongated recess 46 formed within the tuner body 32 on an opposite side of the string break angle fastener 38 relative to the string nut 18. Each string carriage 44 includes a string fastener 48 engageable with the guitar string 22 passing through the respective nut slot 20 and engaged by the string break angle fastener 38 to secure the guitar string to the string carriage. A string aperture 50 is formed in the proximal end of the string carriage 44 for receiving therein the end of the respective guitar sting 22, and the string fastener 48 is threadedly engaged with the carriage in communication with the string aperture 50. As can be seen, the string faster 48 engages the end of the guitar string 22 within the respective string aperture 50 to clamp the guitar string against the opposing surface of the carriage and fixedly secure the guitar string thereto. In the illustrated embodiment, the string fastener 48 is a set screw which is preferably flush with, or recessed within the upper surface of the carriage 44. One advantage of the tuner 10 is that regardless of the position of the string lock carriage 44, the string break angle adjustment fastener 38 allows the user to set and maintain a specific string break angle 40 as the string leaves the tuner and travels to the string nut 18. This is crucial for keeping the string 22 firmly seated in its respective string nut slot 20 for optimal note purity. Another advantage of the tuner 10 is that the string fastener 48 fixedly secures the end of the guitar string 22 to the string carriage 44, and the string carriage encloses the end of the guitar string within the interior of the carriage to thereby prevent the end of the guitar string from contacting a user or otherwise interfering with use of the guitar.

Each tuner 26 includes a tuner knob 52 mounted on the tuner body 32 on an opposite side of the string carriage 44 relative to the string break angle fastener 38. Each tuner knob 52 is drivingly connected to the string carriage 44 to manually move or drive the string carriage 44 either toward or away from the string break angle fastener 38 and thereby adjust the tension of and tune the respective guitar string 22. In the illustrated embodiment, each tuner knob 52 is manually rotatable to drive the string carriage 44 and thereby adjust the tension of the guitar string 22 connected thereto. In the illustrated embodiment, each tuner knob 52 is preferably knurled or otherwise defines a surface texture to facilitate manually gripping or otherwise manipulating the knob.

Figure 2:
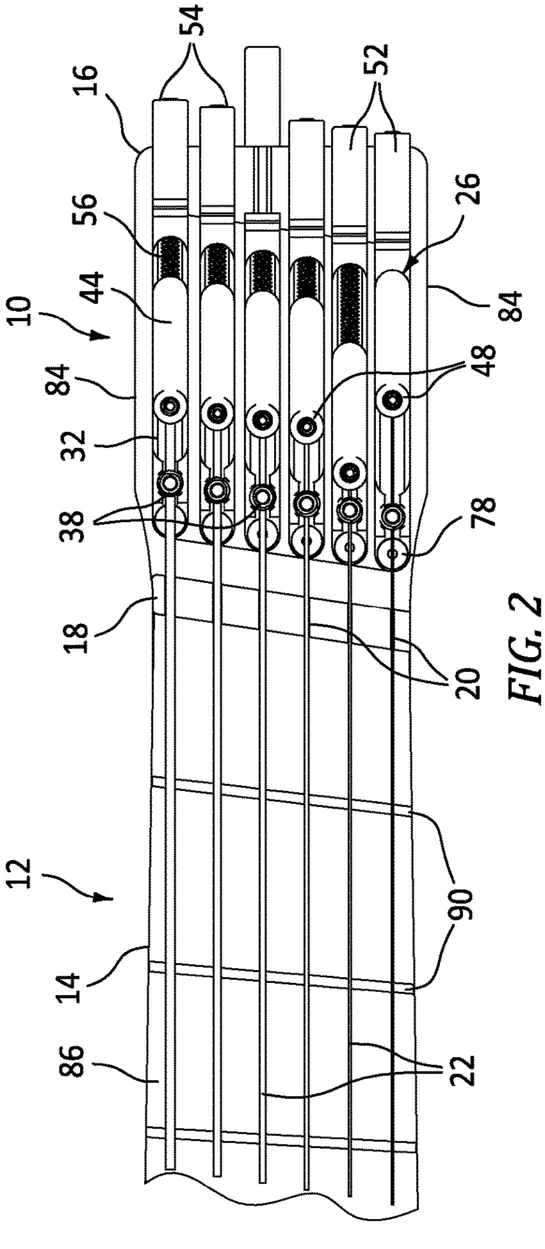
FIG. 2 is a top plan view of the tuner assembly and guitar neck of FIG. 1.
Figure 9C:
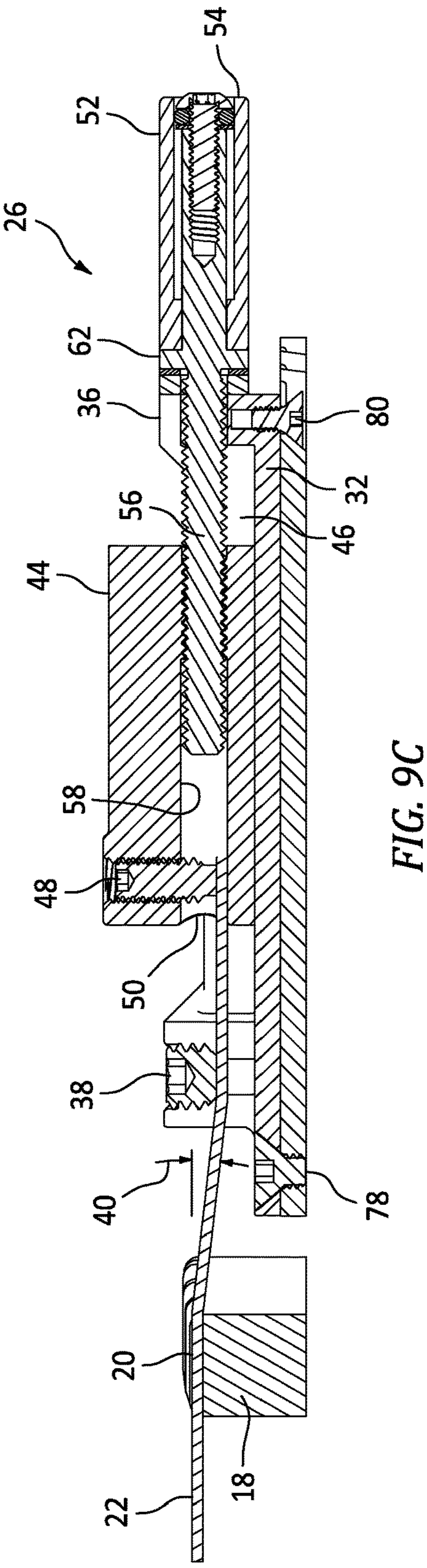
FIG. 9C is a cross-sectional view of another tuner of the tuner assembly of FIG. 8 taken along line C-C of FIG. 8, showing a guitar string passing through the respective nut slot where the string is engaged by the string break angle fastener to set the break angle of the string, the end of the string is received within and connected to the string lock carriage, the string lock carriage is in a midway position between the fully frontward and fully rearward positions, and the tuning knob is in the retracted position.
Figure 9D:
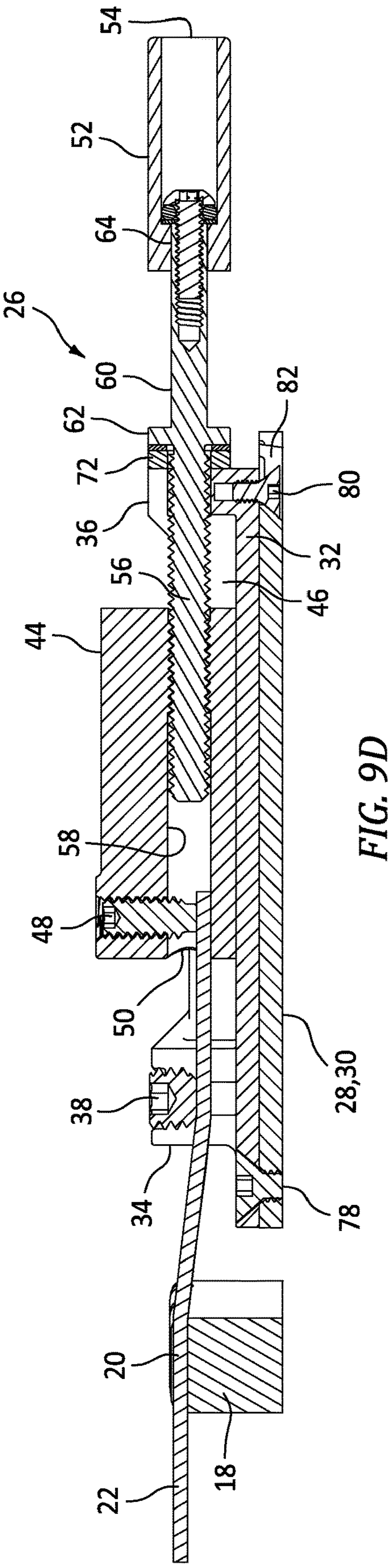
FIG. 9D is a cross-sectional view of another tuner of the tuner assembly of FIG. 8 taken along line D-D of FIG. 8, showing a guitar string passing through the respective nut slot where the string is engaged by the string break angle fastener to set the break angle of the string, the end of the string is received within and connected to the string lock carriage, the string lock carriage is in a midway position between the fully frontward and fully rearward positions, and the tuning knob is in the extended position.
Figure 10:
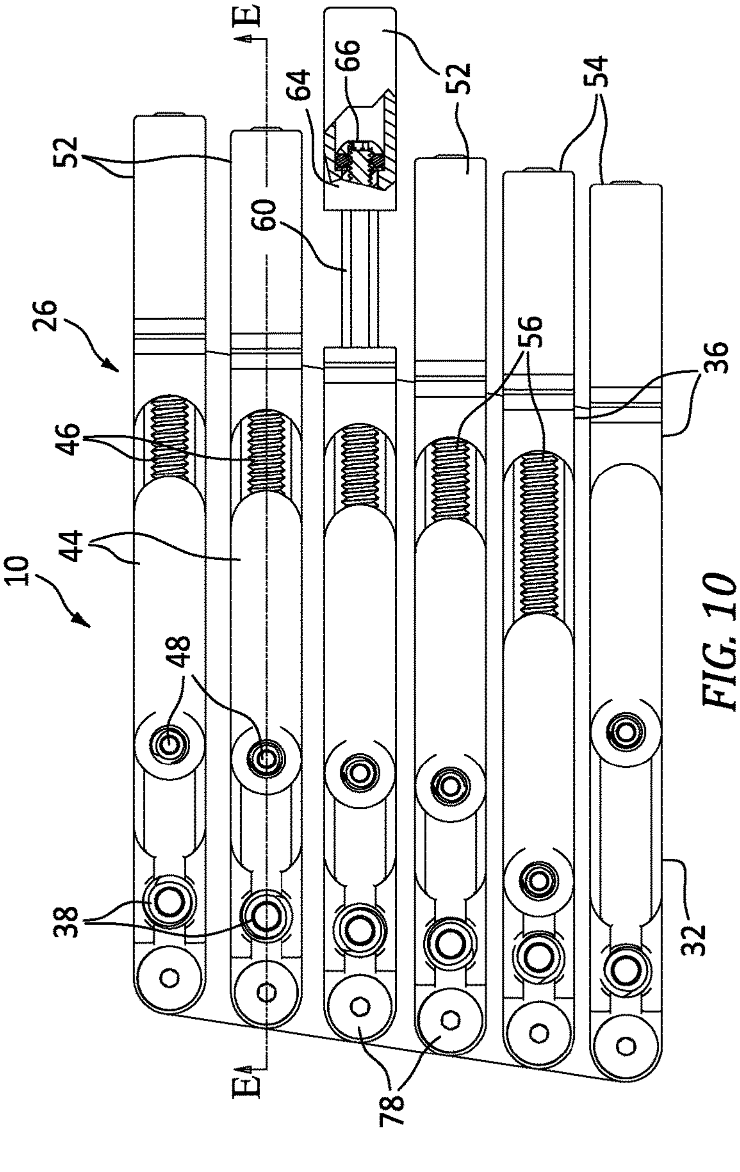
FIG. 10 is a top plan view of the tuner assembly of FIG. 1 not mounted to a guitar neck.
Figure 11:
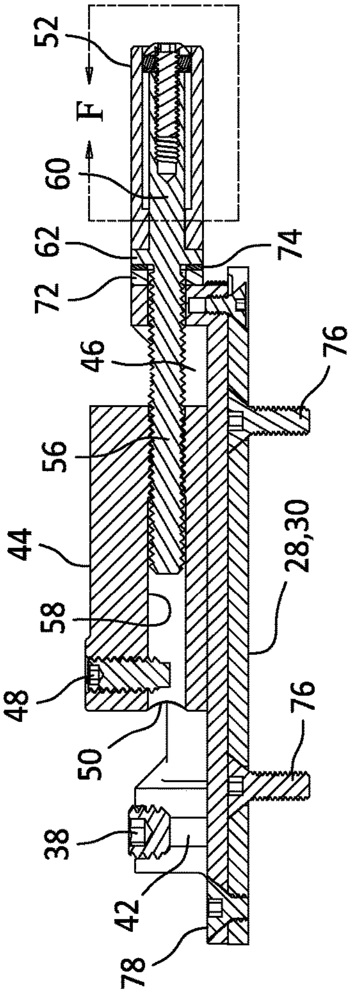
FIG. 11 is a cross-sectional view of one of the tuners of the tuner assembly taken along line E-E of FIG. 10.

As shown typically in FIGS. 9C, 9D and 10, each tuner knob 52 is movable between retracted and extended positions. In the retracted positon, the distal end 54 of the tuner knob 52 is closer to the distal end 36 of the tuner body 32, and in the extended position, the distal end 54 of the tuner knob is farther from the distal end of the tuner body. As shown in FIGS. 1 and 2, in the retracted position, the distal end 16 of the guitar neck 14 is preferably slightly inset from the distal end 54 of each tuner knob 50 to facilitate manually gripping and moving the knob from the retracted to the extended positions, while spacing the distal end of the knob sufficiently close to the neck in the retracted positon to prevent accidental adjustment of or damage to the knob when retracted. Preferably, in the retracted position, the distal end 54 of each tuner knob 52 is spaced less than about ½ inch, preferably less than about ⅓ inch, and more preferably less than about % inch from the distal end 16 of the guitar neck 14.

Each tuner 26 includes a drive member 56 mounted on the tuner body 32 between the string carriage 44 and tuner knob 52. The drive member 56 includes a proximal end drivingly connected to the string carriage 44 and a distal end received through the distal end 36 of the tuner body 32 and connected to the tuner knob 52. Rotation of the tuner knob 52 rotates the drive member 56 to, in turn, drive the string carriage 44 either toward or away from the string break angle fastener 38. In the illustrated embodiment, the drive member 56 is a worm gear, threaded screw or like shaft and is threadedly engaged within an axially-elongated, threaded aperture or bore 58 formed within the string carriage 44. As can be seen, rotation of the drive member 56 by the tuner knob 52 moves the string carriage 44 either toward or away from the string break angle fastener 38 to thereby adjust the tension in and tune the respective guitar string 22.

Figure 12:
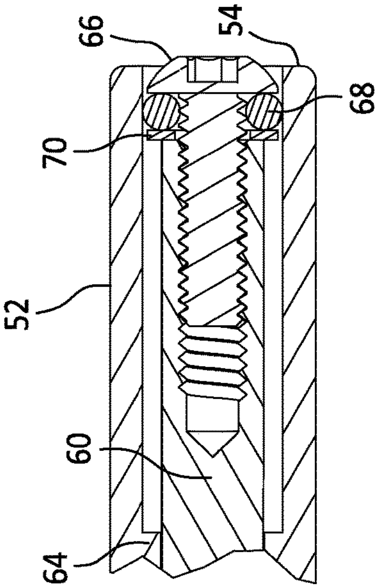
FIG. 12 is an enlarged, cross-sectional view of detail "F" of FIG. 11 showing the sliding tuner knob, tuning knob damper/friction ring, damper/friction ring retaining washer and tuning knob assembly retaining screw of the respective tuner.

Each tuner 26 further includes a tuner knob support 60 mounted on the tuner body 32 and connected to the drive member 56. In the illustrated embodiment, the tuner knob support 60 is a rod or shaft formed integral with the threaded drive member 56 and extending distally therefrom. An annular flange 62 is formed between the tuner knob support 60 and the drive member 56. The tuner knob 52 is hollow and defines on its proximal end a reduced diameter or width portion 64 that is slidably mounted on the tuner knob support 60 to allow axial movement of the tuner knob relative to the support, but prevent relative rotational movement of the knob and its support. In the illustrated embodiment, the reduced diameter or width portion 64 of the tuner knob 52 and the tuner knob support 60 each define a hexagonal, square or other rectilinear cross-sectional shape. Such complementary shapes allow each tuner knob 52 to slide axially on its support 60 between the retracted and extended positions, but keys the knob to the support so that the two parts rotate with each other, not relative to each other. As shown best in FIG. 12, a retaining fastener 66 is threadedly received within the distal end of the tuner knob support 60. A tuning knob damper/friction ring 68 is fixedly secured between the head of the retaining fastener 66 and a damper/friction ring retaining washer 70 abutting the distal end of the tuner knob support 60. The damper/friction ring 68 is made of an elastomeric material that frictionally engages the hollow interior of the tuner knob to facilitate retaining the tuner knob in the retracted and extended positions. In one embodiment, the damper/friction ring 68 is an elastomeric or silicone O-ring. As can be seen, each tuner knob 52 is slidable on the tuner knob support 60 between (i) the retracted position where the proximal end of the tuner knob 52 is adjacent to or contacts the annular flange 62 of the tuner knob support 60, and (ii) the extended position where the reduced diameter portion 64 of the tuner knob engages the retaining washer 70 at the distal end of the support 60. Also in the illustrated embodiment, a magnet 72 and retaining washer 74 are fixedly secured between the annular flange 62 of the tuner knob support 60 and the distal end 36 of the tuner body. The magnet 72 is configured to magnetically attract and thereby releasably retain the tuner knob 52 in the retracted position. One advantage of the tuner 10 is that each tuning knob 52 is able to slide from a "docked" or "retracted" position to a "fully-extended" position. As may be recognized by those of ordinary skill in the pertinent art based on the teachings herein, this functionality can be achieved in any of numerous different ways that are currently known or that later become known. For example, although the illustrated embodiments employ a silicone friction ring that contacts the inside wall of the sliding tuning knob so that it stays put in any position, and a magnet to hold the knob in the "docked" or "retracted" position, this functionality alternatively could be achieved with milled or otherwise formed notches on the inside of the sliding tuning knob that index with a ring around the drive member or knob support, allowing the knob to "snap" into position at each extreme. In addition, the magnet could be eliminated, and the tuner could rely on the friction ring or like device to releasably retain the knob in the retracted or docked position. In addition, other aspects of the tuner knob and/or its support could take any of numerous different configurations that are currently known, or that later become known. For example, the distal end of each tuner knob 52 may define an internal geometry that allows for the use of an external drive tool or device to rotate and operate the mechanism. In one such alternative embodiment, the distal female portion of the tuner knob defines a hexagonal shape configured to receive a hexagonal-shaped tool, such as an Allen wrench, to rotatably drive the knob. Such a tool may allow for speedier adjustments of the knobs. As may be recognized by those or ordinary skill in the pertinent art based on the teachings herein, the knob and tool may take any of numerous different, complementary shapes or configurations in order to achieve such functionality, such as star, square or other rectilinear shapes.

As shown typically in FIGS. 6 and 7, the mounting plates 28 or 30 are fixedly secured to the neck face 24 of the guitar by mounting fasteners 76, 76. In the illustrated embodiment, the mounting fasteners 76, 76 are flat head screws where the heads of the screws are substantially flush with the upper surface of the mounting plate to, in turn, allow the tuner body or bodies to be mounted substantially flush to the mounting plate or plates. As shown in FIGS. 9A-9D, each tuner 26 includes a proximal mounting fastener 78 and a distal connector or fastener 80 for attaching the tuner body 32 to the mounting plate 28 or 30. In the illustrated embodiment, each proximal mounting fastener 78 is a flat head screw that is received through a respective fastener aperture in the tuner body 32 and is threadedly attached to the underlying mounting plate 28 or 30 to fixedly secure the tuner thereto. Preferably, each flat head screw 78 is substantially flush with the respective upper surface of the tuner body 32. Upon removal of the proximal mounting fastener 78, the tuner body 32 is manually movable away from the tuner mount 28 or 30 with the guitar string 22 engaged by the string break angle fastener 38 and/or the string fastener 48. As shown typically in FIG. 7, the distal connector or fastener 80 is a male connector, and the tuner mount 28 or 30 includes a female connector 82. The male connector 80 is receivable within the female connector 82 to releasably secure the distal end of the tuner body 32 to the tuner mount 28 or 30. In the illustrated embodiment, the male connector 80 is defined by a flat head screw threaded into the underside of the distal end of tuner body 32, and the female connector is an open-ended slot formed in the distal end of the mounting plate 28 or 30. As can be seen, the shaft of the screw 80 is received through the open-ended slot 82 with the screw head located on an opposite side of the slot relative to the tuner body to thereby form a dovetail connection and releasably attach the distal end of the tuner body to the support. One advantage of this configuration is that it allows the tuner body 32 to be manually moved away from the tuner mount 28 or 30 with the guitar string 22 engaged by the string break angle fastener 38 and/or the string fastener 48 by moving the male connector 80 away from the female connector 82. This in turn allows nut-slotting to be performed without detaching the guitar string 22 from the tuner 26. In other words, the tuner 26 can be lifted away from guitar nut 18 with the guitar string 22 attached thereto in order to allow the nut to be slotted and properly fitted to the string without detaching the guitar string from the tuner. Accordingly, placement and accessibility of the front and dovetail tuner body mounting fasteners allows for the tuners to be installed and removed from the mounting plate without the need to either detach the mounting plate from the instrument or remove the guitar string from the string lock carriage. As a result, instrument maintenance—specifically string nut shaping and slotting—can be far easier than what would be possible with other headless guitar string-locks mounted an equivalent distance from the string nut.

As shown typically in FIGS. 1 and 2, each tuner body 32 is aligned with and spaced adjacent to a respective nut slot 20 and is configured to receive and engage the respective guitar string 22 passing therethrough. As can be seen, each tuner body 32 defines an elongated axis, each guitar string 22 defines an elongated axis, and the elongated axis of each tuner body is substantially aligned with and substantially parallel to the elongated axis of the respective guitar string. The neck face 24 defines two lateral edges 84, 84 on opposite sides of the face relative to each other. Each lateral edge 84 extends along the respective edge of the neck between the string nut 18 and the distal end 16 of the neck. The plurality of tuner bodies 32, 32 are mounted in a side-by-side relationship between the two lateral edges 84, 84 of the neck face 24. As shown typically in FIGS. 1 and 2, the tuner bodies 32, 32 are preferably located within and do not extend over either lateral edge 84 of the neck face. One advantage of the tuner assembly 10 is the string break angle fastener 38 of each of the plurality of tuner bodies 32, 32 can set substantially the same break angle 40 of the guitar string 22 between the string nut 18 and the break angle fastener 38. Preferably, the substantially same break angle 40 is at least about 5°. In some such embodiments, the substantially same break angle 40 is within the range of about 5° to about 15°.

As shown in FIGS. 1 and 2, the guitar 12 includes a fretboard 86 defining a centerline, the neck 14 defines a distal neck-material protrusion 88 extending between the string nut 18 and the distal end 16 and of the neck 14, and the fretboard 86 includes a plurality of axially-spaced frets 90, 90. The distal neck-material protrusion 88 defines the face 24. Preferably, the neck face 24 is oriented at an angle relative to the centerline of the fretboard 86 within the range of about 0° to about 20°. As indicated above, when the plurality of tuner bodes 32, 32 are mounted on the face 24, the string break angle fastener 38 of each of the plurality of tuner bodies 32, 32 sets substantially the same break angle 40 of the guitar strings 22, 22 between the string nut 18 and the break angle fastener 38. In the illustrated embodiment, the neck face 24 is oriented at an angle of about 0° and is approximately parallel to the centerline of the fretboard 86 to thereby define a straight "headstock" or distal end portion of the neck. In other embodiments, the angle of the neck face relative to the centerline of the fretboard is greater than 0° to thereby define an angled "headstock" or distal end portion of the neck.

In the operation of the tuner assembly 10, the plurality of tuners 26, 26 are mounted to the neck face 24 where the tuner assembly includes one tuner 26 for each guitar string 22 and the tuners are mounted in a side-by-side relationship preferably between the lateral edges 84, 84 of the neck face. As indicated above, the tuners 26, 26 can be mounted on individual mounting plates 28, 28, or a plurality of tuners can be mounted on a ganged mounting plate 30. If desired, any combination of ganged and individual mounting plates may be employed. As shown in FIGS. 9A-9D, each guitar string 22, 22 passes through the respective nut slot 20 and proximal aperture 42 of the respective tuner body 32 where the upper side of the string is engaged by the string break angle fastener 38 to set the break angle 40 of the string between the nut slot and tuner. The end of each guitar string 22 is received within the proximal aperture 50 of the respective string lock carriage 44 where the string is clamped by the respective string lock fastener 48 and fixedly connected to, and retained within the interior of the carriage. In order to perform any required nut slotting, the respective tuner 26 may be lifted away from the mounting plate 28 or 30 with the respective guitar string 22 connected thereto to thereby remove the string away from its nut slot and allow the slot to be cut, filed and/or otherwise worked to the correct size. As described above, the proximal fastener 78 is removed and the tuner body 32 is moved distally or rearwardly to disconnect or remove the male connector or screw 80 from its dovetail slot 82 in the mounting plate 28 or 30. During nut slotting, the tuner 26 can be relatively easily moved into and out of its installed position to test that the slot is appropriately gauged and/or fitted to the string. Each guitar string 22 is tuned by manually gripping the respective tuner knob 52, moving the knob from its retracted to its extended position, and rotating the knob to, in turn, move the string carriage 44 and the guitar string 22 connected thereto either proximally or distally to thereby adjust the tension in and tune the string. In the extended position, the elastomeric ring 68 frictionally and/or resiliently engages the interior of the tuner knob 52 to releasably retain the tuner knob in the extended position. Once the string is tuned, the tuner knob 52 is pushed inwardly back into its retracted position. In the retracted position, the elastomeric ring also releasably retains the knob in its retracted position. If desired, each tuner 26 may include the magnet or like device 72 to magnetically releasably retain the tuner knob in its retracted position. As may be recognized by those of ordinary skill in the pertinent art based on the teachings herein, other devices to releasably retain the tuner knobs in their retraced, extended and/or other positions, that are currently known, or that later become known, equally may be employed.

One advantage of the tuner assembly 10 is that is that it may be mounted to the top surface of an area behind the string nut and is inherently compact enough to preserve the benefits of a headless guitar, while allowing a guitar-maker to use traditional (non-headless) hardware on the guitar. Thus, in contrast to the above-described prior art headless guitars that are reliant on specific and limited headless hardware, the tuner assemblies of the present invention can allow for virtually any bridge hardware to be used. Another advantage is that the small, removable set-screw or other string break angle fastener located at the front of the tuner allows for independent adjustment of the break angle of the string, easy restringing and optimal string tension. Yet another advantage is that the string break angle fastener or set-screw eliminates the stringing difficulty and potential buzzing issues encountered in the above-described prior art. A further advantage is that each tuning knob is able to slide along its respective knob support, such as the illustrated hex shaft, past the edge of the "headstock" (or distal end 16 of the neck) to allow the user to comfortably adjust the pitch of each string without the other tuners in the way. Accordingly the sliding knobs are much more comfortable to use than other systems and can be manipulated without the others in the way. In addition, in contrast to the above-described headless string-locks or headpieces, each tuner 26 of the tuner assembly 10 can be attached to either an individual or ganged mounting plate 28 or 30, allowing for quicker, simpler installation with perfect or substantially perfect alignment. Yet another advantage is that the tuners and tuner assemblies can be installed on virtually any neck to be able to make a "headless" version of that guitar.

As may be recognized by those of ordinary skill in the pertinent art based on the teachings herein, numerous additions, deletions, changes and improvements may be made to the above-described and other embodiments of the present invention without departing from its scope as defined in the appended claims. For example, the tuner mounts, tuner bodies, string lock carriages, carriage drive mechanisms, string break angle fasteners, string lock fasteners, tuner knobs and/or tuner knob supports, may take the form of any of numerous different types, configurations or shapes, or may be made of any of numerous different materials, that are currently known or that later become known. In addition, additional components or features may be added and some of the disclosed components or features may be removed. Accordingly, this detailed description of embodiments is to be taken in an illustrative as opposed to a limiting sense.

What is claimed is:

1. A tuner for a guitar comprising a neck having a proximal end and a distal end, and a string nut mounted on the neck proximal to the distal end thereof and including a plurality of nut slots laterally spaced relative to each other, wherein each nut slot is configured to receive a respective guitar string, and the neck defines a neck face extending between the string nut and the distal end of the neck, the tuner comprising:

- a tuner mount configured to be seated on and fixedly secured to the neck face;
- a tuner body configured for mounting on the tuner mount and including a proximal end and a distal end;
- a string break angle fastener mounted on the tuner body at or adjacent to the proximal end thereof and spaced adjacent to a respective nut slot, wherein the break angle fastener is engageable with a guitar string passing through the respective nut slot and sets a break angle of the guitar string between the string nut and the break angle fastener;
- a string carriage movably mounted on the tuner body on an opposite side of the string break angle fastener relative to the string nut, and including a string fastener engageable with the guitar string passing through the respective nut slot and engaged by the string break angle fastener to secure the guitar string to the string carriage; and
- a tuner knob mounted on the tuner body on an opposite side of the string carriage relative to the string break angle fastener and drivingly connected to the string carriage, the tuner knob is manually movable to drive the string carriage either toward or away from the string break angle fastener to adjust the tension of and tune the respective guitar string.

2. A tuner as defined in claim 1, wherein the tuner knob is movable between retracted and extended positions, a distal end of the tuner knob is closer to the distal end of the tuner body in the retracted position and is farther from the distal end of the tuner body in the extended position, and the tuner knob is manually movable in the extended position to tune the respective guitar string.

3. A tuner as defined in claim 2, wherein in the retracted position, the distal end of the guitar neck is inset adjacent to the distal end of the knob to prevent accidental adjustment of or damage to the knob in the retracted position.

4. A tuner as defined in claim 3, wherein in the retracted position, the distal end of the tuner knob is spaced less than about % inch from the distal end of the neck.

5. A tuner as defined in claim 2, further comprising a drive member mounted on the tuner body between the string carriage and tuner knob and including a proximal end and a distal end, wherein the proximal end is drivingly connected to the string carriage, and the distal end is connected to the tuner knob, and rotation of the tuner knob moves the drive member to move the string carriage either toward or away from the string break angle fastener.

6. A tuner as defined in claim 5, wherein the drive member is threadedly engaged with the string carriage, and rotation of the drive member by the tuner knob moves the string carriage toward or away from the string break angle fastener.

7. A tuner as defined in claim 2, wherein the drive member is rotatably mounted on the tuner body and rotation of the tuner knob rotates the drive member to move the string carriage either toward or away from the string break angle fastener.

8. A tuner as defined in claim 7, further comprising a tuner knob support mounted on the tuner body and connected to the drive member, wherein the tuner knob is slidably mounted on the tuner knob support to move between the retracted and extended positions.

9. A tuner as defined in claim 8, further comprising a dampening or friction member mounted on the tuner knob support or tuner knob and engageable with the other to releasably retain the tuner knob in the retracted and/or extended positions.

10. A tuner as defined in claim 9, wherein the dampening or friction member is made of an elastomeric or resilient material, is mounted on the tuner knob support, and frictionally engages the tuner knob.

11. A tuner as defined in claim 8, further comprising a magnet configured to releasably retain the tuner knob in the retracted position.

12. A tuner as defined in claim 8, further comprising an elastomeric ring mounted on the tuner knob support or tuner knob and engageable with the other to releasably retain the tuner knob in the retracted and/or extended positions.

13. A tuner as defined in claim 1, further comprising a mounting fastener releasably securing the tuner body to the tuner mount, wherein upon removal of the mounting fastener, the tuner body is movable away from the tuner mount with the guitar string engaged by the string break angle fastener and/or the string fastener.

14. A tuner as defined in claim 13, wherein one of the tuner body or tuner mount includes a male connector, and the other of the tuner body or tuner mount includes a female connector, and the male connector is receivable within the female connector to releasably secure the tuner body to the tuner mount.

15. A tuner as defined in claim 14, wherein (i) the male connector defines a pin or protuberance and the female connector defines a corresponding receptacle for receiving the pin or protuberance, or (ii) the male connector and female connector define a dovetail connection.

16. A tuner as defined in claim 14, wherein the tuner body includes a fastener aperture at or adjacent to the proximal end and the male connector connected thereto at or adjacent to the distal end, and upon removal of the mounting fastener from the mounting plate, the tuner body is movable away from the tuner mount with the guitar string engaged by the string break angle fastener and/or the string fastener by moving the male connector away from the female connector.

17. A tuner as defined in claim 1, comprising a plurality of said tuner bodies, wherein each tuner body is aligned with and spaced adjacent to a respective nut slot and is configured to receive and engage the respective guitar string passing therethrough.

18. A tuner as defined in claim 17, wherein each tuner body defines an elongated axis, each guitar string defines an elongated axis, and the elongated axis of each tuner body is substantially aligned with and substantially parallel to the elongated axis of the respective guitar string.

19. A tuner as defined in claim 18, wherein the neck face defines two lateral edges on opposite sides of the face relative to each other, each lateral edge extends along the respective edge of the neck between the string nut and the distal end of the neck, and the plurality of tuner bodies are mounted in a side-by-side relationship between the two lateral edges of the neck face.

20. A tuner as defined in claim 19, wherein the tuner bodies are located within and do not extend over either lateral edge of the neck face.

21. A tuner as defined in claim 17, wherein the string break angle fastener of each of the plurality of tuner bodies sets substantially the same break angle of the guitar string between the string nut and the break angle fastener.

22. A tuner as defined in claim 21, wherein the substantially same break angle of the plurality of tuner bodies is at least about 5°.

23. A tuner as defined in claim 22, wherein the substantially same break angle of the plurality of tuner bodies is within the range of about 5° to about 15°.

24. A tuner as defined in claim 21, wherein the guitar includes a fretboard defining a centerline, the neck defines a distal neck-material protrusion extending between the string nut and the distal and of the neck, the distal neck-material protrusion defines the face and the face is oriented at an angle relative to the centerline of the fretboard within the range of about 0° to about 20°, and when the plurality of tuner bodes are mounted on the face, the string break angle fastener of each of the plurality of tuner bodies sets substantially the same break angle of the guitar string between the string nut and the break angle fastener.

25. A tuner as defined in claim 24, wherein the face is oriented at an angle of about 0° and is approximately parallel to the centerline of the fretboard.

26. A tuner as defined in claim 17, further comprising (i) a single tuner mount having mounted thereon a plurality of tuner bodies in side-by-side relationship to each other, or (ii) a plurality of tuner mounts, wherein each of the tuner mounts includes a single tuner body or a plurality of tuner bodies mounted thereon, and all tuner bodies are mounted in side-by-side relationship to each other.

27. A tuner as defined in claim 26, wherein the tuner mount is a tuner mounting plate.

28. A tuner as defined in claim 27, further comprising a plurality of tuner mounting plates configured to be mounted in a side-by-side relationship to each other on the neck face extending between the string nut and the distal end of the neck.

29. A tuner as defined in claim 27, wherein the tuner mounting plate is a gang mounting plate configured to be mounted on the neck face extending between the string nut and the distal end of the neck and for the plurality of tuner bodies to be mounted thereon in a side-by-side relationship to each other.

30. A tuner as defined in claim 1, wherein the string carriage defines an aperture in a proximal end thereof configured to receive therein a distal end of the respective guitar string, and the string fastener is received within the aperture and configured to clamp the guitar string and enclose the end of the guitar string in an interior of the carriage.

31. A tuner as defined in claim 1, in combination with a guitar comprising a neck having a proximal end and a distal end, a string nut mounted on the neck proximal to the distal end thereof and including a plurality of slots laterally spaced relative to each other, wherein each nut slot is configured to receive a respective guitar string, the neck defines a distal neck-material protrusion extending between the string nut and the distal and of the neck, the distal neck-material protrusion defines a face extending between the string nut and the distal end of the neck configured to receive the tuner mount seated on and fixedly secured thereto, and the distal neck-material protrusion defines a length that is sufficiently short to prevent the installation or operation of traditional through-mounted-string tuning mechanisms thereon.

32. A tuner and guitar as defined in claim 31, wherein the guitar is a bass guitar.

33. A tuner for a guitar comprising a neck having a proximal end and a distal end, and a string nut mounted on the neck proximal to the distal end thereof and including a plurality of nut slots laterally spaced relative to each other, wherein each nut slot is configured to receive a respective guitar string, and the neck defines a neck face extending between the string nut and the distal end of the neck, the tuner comprising:

first means for seating the tuner thereon and fixedly securing the tuner to the neck face;

a body including a proximal end and a distal end;

second means mounted on the body adjacent to the proximal end thereof and spaced adjacent to a respective nut slot for engaging a guitar string passing through the respective nut slot and setting a break angle of the guitar string between the string nut and the second means;

third means for moving on the body on an opposite side of the second means relative to the string nut, and including fourth means for engaging the guitar string passing through the respective nut slot and engaged by the second means for securing the guitar string to the third means; and fifth means mounted on the body on an opposite side of the third means relative to the second means for manually moving the third means either toward or away from the second means for adjusting the tension of and tuning the respective guitar string.

34. A tuner as defined in claim 33, wherein the first means is one or more tuner mounting plates, the second means is a string break angle fastener, the third means is a string carriage, the fourth means is a string fastener, and the fifth means is a tuner knob.

35. A tuner as defined in claim 33, further comprising sixth means for supporting and allowing movement of the fifth means between retracted and extended positions, wherein a distal end of the fifth means is closer to the distal end of the tuner body in the retracted position and is farther from the distal end of the tuner body in the extended position, and the fifth means is manually movable in the extended position to tune the respective guitar string.

36. A tuner as defined in claim 35, further comprising seventh means for releasably retaining the fifth means in the retracted position.

37. A tuner as defined in claim 36, wherein the seventh means is an elastomeric ring frictionally engaged between the fifth means and the sixth means for frictionally releasably retaining the fifth means in the retracted position, or a magnet mounted on the fifth means or sixth means for magnetically releasably retaining the fifth means in the retracted position.

* * * * *